United States Patent [19]
Alonso

[11] Patent Number: 5,551,023
[45] Date of Patent: Aug. 27, 1996

[54] SYSTEM OF DATABASE CONCURRENCY CONTROL BASED ON TRANSACTION TYPES AND PRIOR ACCESS TO A DATA SET

[75] Inventor: Rafael Alonso, Plainsboro, N.J.

[73] Assignee: Panasonic Technologies, Inc., Princeton, N.J.

[21] Appl. No.: 286,709

[22] Filed: Aug. 5, 1994

[51] Int. Cl.$^6$ .................................................. G06F 17/30
[52] U.S. Cl. ..................... 395/600; 364/DIG. 1; 364/282.1
[58] Field of Search ........................... 395/600; 364/402

[56] References Cited

U.S. PATENT DOCUMENTS

| | | | |
|---|---|---|---|
| 4,956,772 | 9/1990 | Neches | 395/650 |
| 5,084,816 | 1/1992 | Boese et al. | 395/575 |
| 5,095,421 | 3/1992 | Freund | 395/650 |
| 5,233,533 | 8/1993 | Edstrom et al. | 364/468 |
| 5,291,397 | 3/1994 | Powell | 364/402 |
| 5,369,570 | 11/1994 | Parad | 364/401 |
| 5,406,476 | 4/1995 | Deziel, Jr. et al. | 364/402 |

OTHER PUBLICATIONS

K. P. Eswaran, J. N. Gray, R. A. Lorie, and I. L. Traiger, "The Notions of Consistency and Predicate Locks in a Database System", Comm. of the ACM, vol. 19, No. 11, (Nov. 1976) pp. 624–633.

David P. Reed, "Implementing Atomic Actions on Decentralized Data", ACM Transactions on Computer Systems, vol. 1, No. 1, (Feb. 1983) pp. 3–23.

Daniel J. Rosenkrantz, Richard E. Stearns, and Philip M. Lewis, II, "System Level Concurrency Control for Distributed Database Systems", ACM Transactions on Database Systems, vol. 3, No. 2, (Jun. 1978) pp. 178–198.

Robert Abbott & Hector Garcia–Molina, "Scheduling Real–Time Transactions: A Performance Evaluation", Proceedings of 14th VLDB Conf., (1988), pp. 1–12.

Sha et al, "A Real–Time Locking Protocol", IEEE Transactions on Computers, vol. 40, No. 7, Jul. 1991, pp. 793–800.

Song et al, "How Well Can Data Temporal Consistency be Maintained?", IEEE Symposium on Computer–Aided Control System Design, 17–19 Mar. 1992, pp. 275–284.

*Primary Examiner*—Wayne Amsbury
*Attorney, Agent, or Firm*—Ratner & Prestia

[57] ABSTRACT

A priority scheme is used to control concurrent access to a database. The priority scheme takes advantage of the usual delay in a process after a first full set of data is accessed in order to improve the overall impression of the speed of the system. Access to the database is granted on the basis of priority. In the disclosed exemplary embodiment of the invention, three priorities are established: a first priority for fast-response type transactions which have not yet accessed a set of data, a second priority for fast-response transactions which have accessed a set of data, and a third priority for batch transactions. When a fast-response transaction is initiated, it is given the first priority. Once a predefined number of data values have been obtained from the database, enough to produce a full screen display, the transaction receives the second priority. A transaction may be assigned the first priority periodically, when it needs to access a further set of data. A first priority transaction can block a second priority transaction and can kill a third priority transaction. A first priority transaction can only block a second priority transaction. A second priority transaction is not necessarily given priority over a third priority transaction, however.

10 Claims, 3 Drawing Sheets

SYSTEM OF DATABASE CONCURRENCY CONTROL BASED ON TRANSACTION TYPES AND PRIOR ACCESS TO A DATA SET

FIELD OF THE INVENTION

The present invention relates to database management systems in general and specifically to concurrency control methods used by database systems. In particular, a method is disclosed for controlling concurrent access to a database system by establishing a priority scheme by which a number of items are accessed for initial processing as quickly as possible.

BACKGROUND OF THE INVENTION

Control methods are used by commercial database systems to provide for concurrent access to the database systems. It is common for many database users to seek concurrent access to an information retrieval system in order to read data from the database and write data to the database. Concurrency control methods are used to manage the users and the users' requests.

The main concurrency control methods employed by commercial database systems are locking techniques. The book by H. F. Korth and A. Silberschatz, entitled *Database System Concepts*, McGraw-Hill, 1991, which is incorporated herein by reference for its teaching on database systems, gives a detailed review of locking protocols. In such schemes, each data item has a number of locks associated with it. A transaction wishing to read that item must first acquire the corresponding read lock. Similarly, before an update, a write lock must be requested. A number of transactions may obtain concurrent read locks, but only if no other transaction is currently holding a write lock. Write locks can only be granted to one requester at a time. When the transaction has finished accessing the data item, it releases the locks which guard that item.

The most widely used locking protocol is two-phase locking as discussed in K. P Eswaran et al., "The Notions of Consistency and Predicate Locks in a Data Base System", *Communications of the ACM*, November 1976, which is incorporated herein by reference for its teachings on database systems. This method prohibits a transaction from requesting any new locks until that transaction has released any old locks.

Another class of widely-studied concurrency control methods involves timestamp protocols as discussed in D. Reed, "Implementing Atomic Actions on Decentralized Data", *ACM Transactions on Computer Systems*, February 1983, which is incorporated herein by reference for its teachings on database systems. This timestamp concurrency control method requires that a transaction acquire a unique timestamp before starting execution. Each data item has two values associated with it: (1) a write timestamp, which denotes the latest timestamp of any transaction that ever updated the item, and (2) a read timestamp, which consists of the latest timestamp of any transaction that ever read the associated data. The use of these timestamps guarantees that the transactions are executed in sequential order without read/write conflicts.

A typical timestamp-based scheme would work as follows. Suppose a transaction T tries to read an item which has an update timestamp that is more recent than T's timestamp. This means that T is trying to read data written by a transaction that started after T; i.e., the value that T should have read has already been overwritten by a subsequent transaction. Thus, transaction T must be aborted and restarted with a new timestamp.

There are a number of variations on the timestamp theme. A well-known technique is the wait-die protocol, discussed in D. J. Rosenkrantz et al., "System Level Concurrency Control for Distributed Database Systems", *ACM Transactions on Database Systems*, June 1978, which is incorporated herein by reference for its teachings on database systems. Under this scheme, if a transaction T1 needs to access an item, either for reading or writing, and the item is protected by locks that are already held by transaction T2, T1 is allowed to wait for the item only if its timestamp is smaller than that of T2, i.e., if T1 is older than T2. Otherwise, T1 is rolled back. A second variation is the wound-wait protocol, also discussed in Rosenkrantz, in which transactions are only allowed to wait for items held by older transactions, otherwise the transaction holding the item is rolled back and the item is released. Again, see the book by Korth and Silberschatz, entitled *Database System Concepts*, for a detailed review of timestamp protocols.

A third class of concurrency control methods has been developed for real time databases, R. Abbott and H. Garcia-Molina, "Scheduling Real-Time Transactions: A Performance Evaluation", *Proceedings of the 14th International Conference on Very Large Databases*, 1988, which is incorporated herein by reference for its teachings on database systems. Transactions in such database management systems must finish before their deadlines. Thus, concurrency control methods for such systems attempt to schedule transactions in such a way that all, or at least most, finish completely before their deadlines. A typical scheme consists of giving preference to high priority transactions. A higher priority transaction which needs to access data held by a lower priority transaction forces the lower priority transaction to abort, and a lower priority transaction waits for a higher priority transaction to release the data. The priorities considered are first-come-first-served, earliest deadline, and least slack. Slack is an estimate of how long the transaction can be delayed and its deadline still met. First-come-first-served and earliest deadline assign fixed priorities, while the priorities assigned under least slack are constantly increasing.

SUMMARY OF THE INVENTION

A method of controlling concurrency in a database includes the following steps. First, each one of a plurality of transactions is designated as either a fast-response type or a batch type. It is then determined if each one of the plurality of transactions that is designated fast-response type has not accessed a first set of data. A high database access priority value is then assigned for each one of the plurality of transactions that is designated fast-response type and has not accessed the first set of data. A low database access priority value for each one of the plurality of transactions that is designated fast-response type and has accessed the first set of data is then assigned.

DETAILED DESCRIPTION

The invention is a new method involving a novel type of locking protocol for concurrency control which results in faster response times in database management systems (DBMSs).

Figure 1:
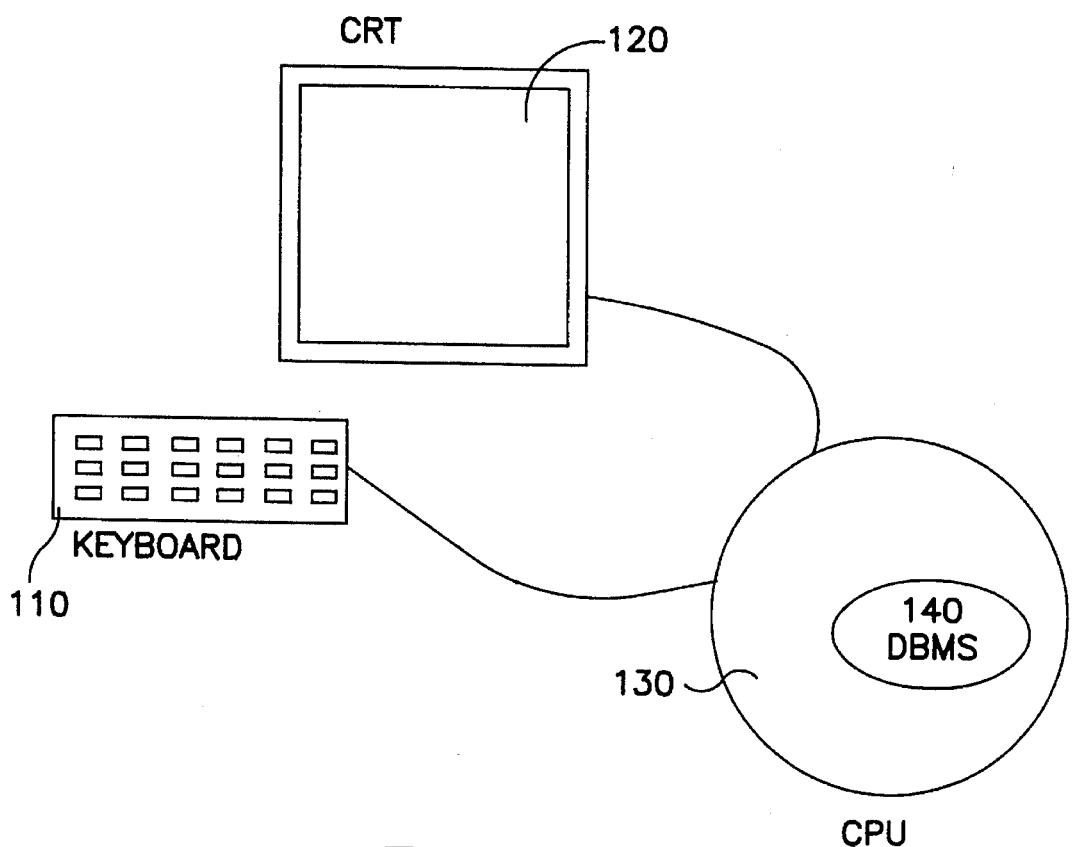
FIG. 1 is a block diagram of a system configuration in accordance with an exemplary embodiment of the present invention showing the input and output means.

FIG. 1 shows the input and output means of a system configuration of an exemplary embodiment of the present invention. A user enters transaction requests to an information management system by using a keyboard 110 or some other input device such as a mouse or a pen. The results of the user's transaction requests are then processed. One exemplary way in which the data may be processed is to display the data on a cathode ray tube (CRT) 120 or some other display device. The DBMS 140 is running in the central processing unit (CPU) shown 130. A centralized DBMS is shown in FIG. 1, but the method of the invention applies equally well to a distributed DBMS. In addition, although display processing is shown in FIG. 1, other types of processing for the first data set are contemplated.

Transactions are divided into two types: fast-response and batch. Fast-response transactions are those for which response time is of interest; typically, interactive ones. Transactions that are not fast-response transactions are considered batch transactions. A system defined parameter, K, denotes the number of items that are to be displayed as quickly as possible. K may be determined by the number of display lines in the display device or by the likely number of items that a user would desire to view at once or in quick succession. Furthermore, the parameter K could be made specific to each transaction instance or to classes of transactions. A global K is chosen here for explanatory expediency. The invention gives higher priority to fast-response transactions that are in the process of emitting the first K items.

Figure 2:
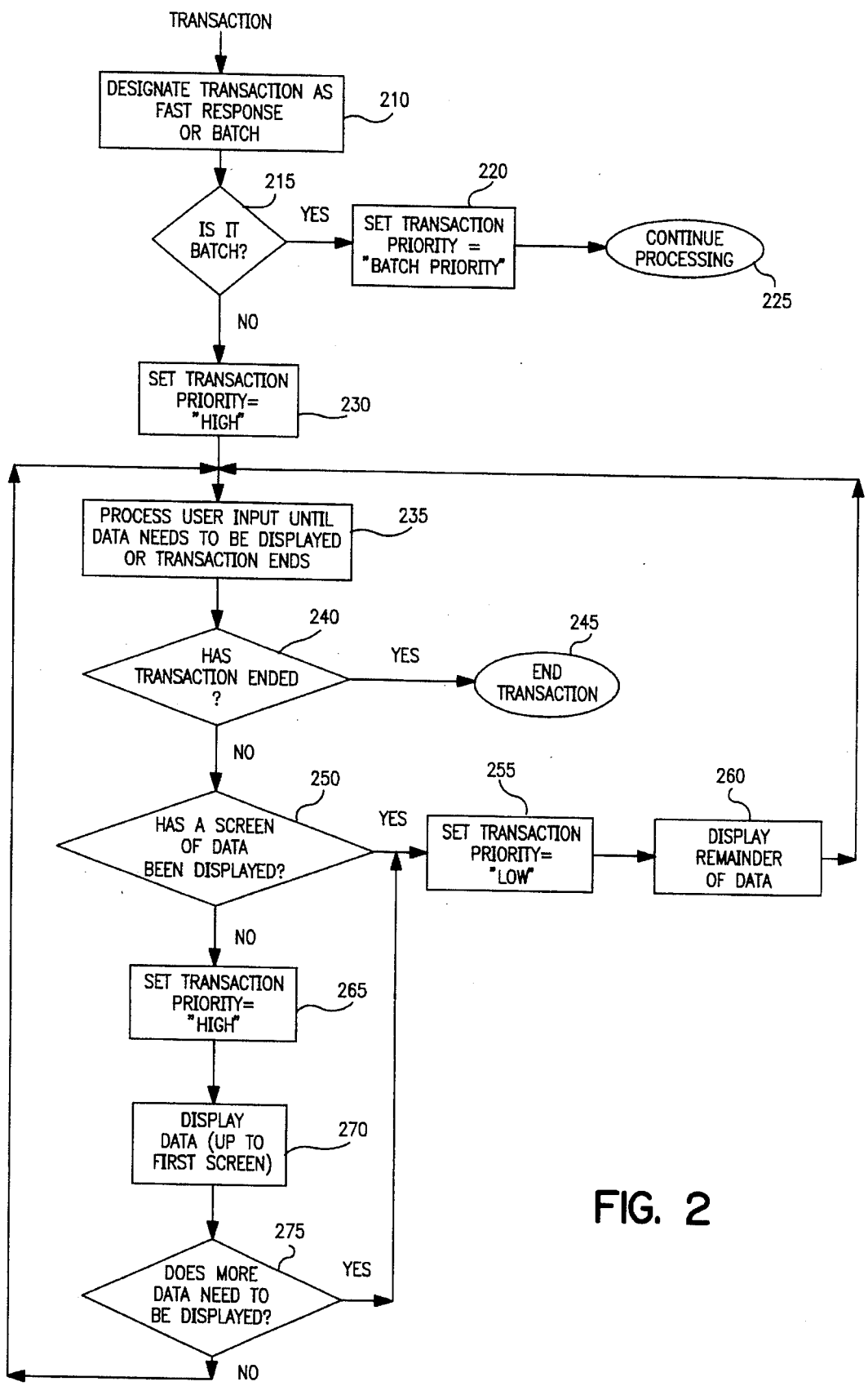
FIG. 2 is a flowchart diagram of a concurrency control method in accordance with an exemplary embodiment of the present invention.

FIG. 2 is a flowchart which illustrates the manner in which an exemplary embodiment of the invention operates. The user starts the transaction and the transaction is designated, in a transaction identification bit, as being a fast-response type or a batch type transaction by designator 210. If the transaction type is batch as determined by checking the transaction identification bit at step 215, the transaction priority value is set to "batch priority" at step 220 and processing continues at step 225.

The transaction priority value is based on the preferences of the system and determines whether a transaction is given to access the database. This access allows the transaction to either read a data item from the database or to write a data item to it.

If the transaction type is not batch as determined by step 215, step 230 sets the transaction priority to "high" and then, at step 235, the user input is processed until data needs to be displayed or the transaction ends. At step 240 it is determined if further processing is required. If no further processing is required then the transaction ends at step 245. If the transaction has not ended, as determined at step 240, step 250 determines if a first set of data, K items, has been accessed by the task and, in this exemplary embodiment of the invention, has been displayed on the display device. If a first set of data has been accessed, step 255 sets the transaction priority to "low", step 260 displays the remainder of the data and processing continues at step 235. Otherwise, step 265 sets the transaction priority to "high", data is displayed at step 270, and step 275 determines if it is desirable to access an additional K items of data for the transaction. If additional data needs to be displayed, as determined at step 275, processing continues at step 255. If no additional data needs to be displayed, processing continues at step 235.

Figure 3:
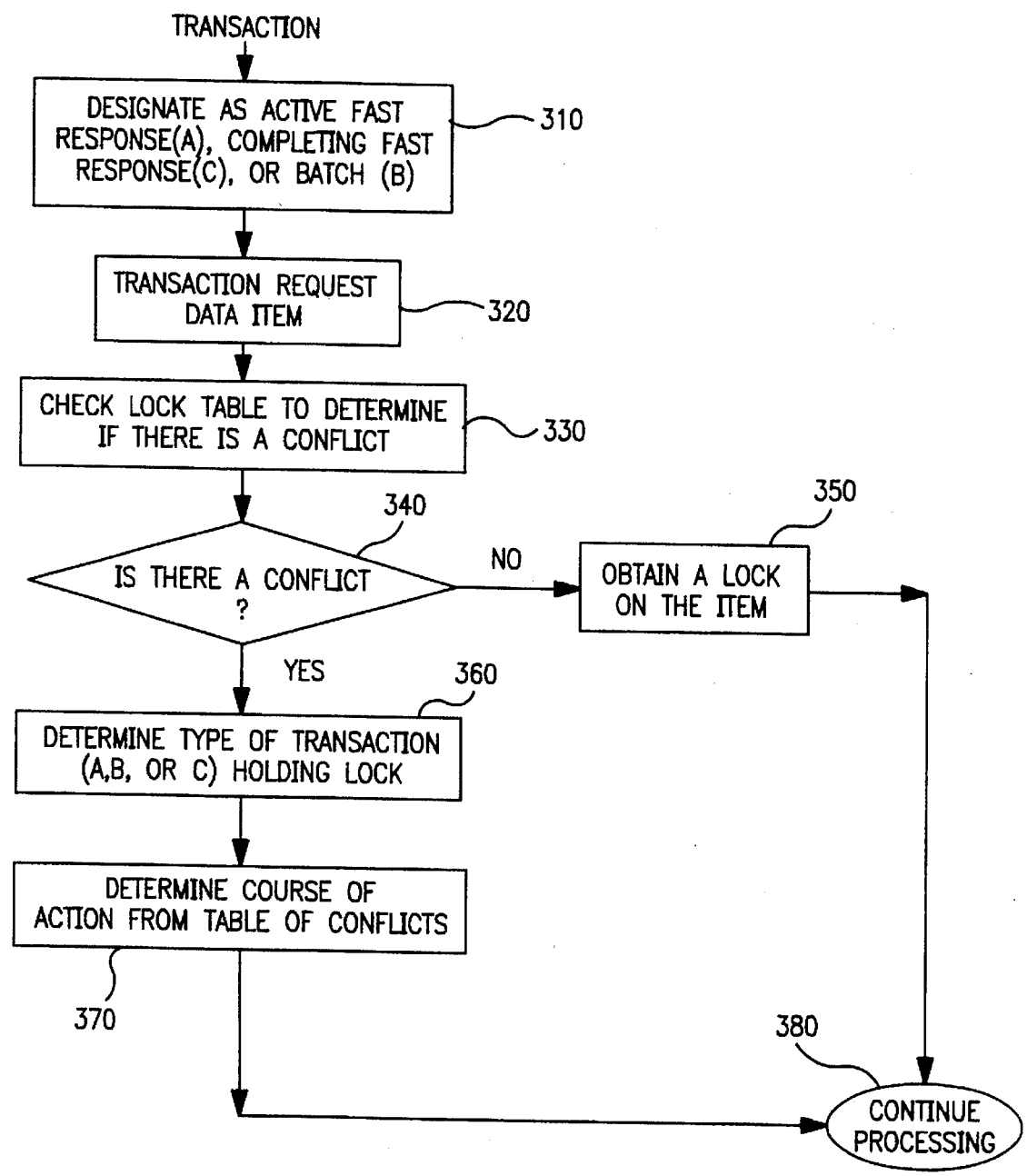
FIG. 3 is a flowchart diagram in accordance with a further exemplary embodiment of the present invention.

FIG. 3 is a flowchart diagram which illustrates a further exemplary embodiment of the present invention. The user starts the transaction and a designator 310 labels the transaction as active fast-response (A), completing fast-response (C), or batch (B) by setting a transaction identification bit field. "A" is given to those fast-response transactions that have not accessed a first set of data; i.e., those transactions that are in the process of emitting the first K items of data. "C" is given to those fast-response transactions that have already produced a first set of data; i.e., those transactions that have already produced K items of data. "B" is given to batch transactions. The transaction then requests a data item at step 320 and a lock table is checked at step 330 to determine at step 340 if there is a conflict with another transaction.

If there is no conflict, step 350 obtains, depending on the request and the data item, either a read lock or a write lock and processing continues at step 380. If there is a conflict with another transaction, the type of transaction holding the lock is determined at step 360. Based on the lock requested, the requesting transaction type, the lock held by the conflicting transaction, and the conflicting transaction type, step 370 determines the course of action from the table of conflicts shown in Table 1.

Type A transactions are given priority over type B and C transactions, although type C transactions are not given priority over type B transactions. The increased priority of type A transactions may result in some type B transactions being forced to abort, so as not to block the higher priority ones. However, type C transactions are not aborted if they block type A transactions, but a type C transaction may have to wait until the type A transaction has finished. Aborting a type C transaction that has already produced output to a user would require a message to the user to disregard the output, and would increase the response time of the system.

As determined by the table of conflicts, if a read lock is requested and a read lock is held, then a shared holding of the locks occurs. If the requested transaction is type A and a type B transaction holds a write lock for the data, then, according to the table of conflicts, the transaction currently holding the lock is forced to abort. This is also the case if the transaction requested is type A and a write lock is requested and a type B transaction holds a read lock for the data. For all other transactions, the requesting transaction blocks the transaction currently holding the lock, but does not force it to abort. After the course of action has been determined, processing continues at step 380.

The table of conflicts is shown in Table 1. RA denotes a read lock requested by a type A transaction and WA denotes a write lock requested by a type A transaction. RB, WB, RC, and WC have the obvious meanings. In the table, S means that shared holding of the locks is possible, X means that the requesting transaction must block the transaction currently holding the lock, and KL means that the requesting transaction forces the transaction currently holding the lock to abort.

TABLE 1

|  |  | Lock Held | | | | | |
| --- | --- | --- | --- | --- | --- | --- | --- |
|  |  | RA | WA | RB | WB | RC | WC |
| Lock Requested | RA | S | X | S | KL | S | X |
|  | WA | X | X | KL | KL | X | X |
|  | RB | S | X | S | X | S | X |
|  | WB | X | X | X | X | X | X |

TABLE 1-continued

|  | Lock Held | | | | | |
|---|---|---|---|---|---|---|
|  | RA | WA | RB | WB | RC | WC |
| RC | S | X | S | X | S | X |
| WC | X | X | X | X | X | X |

A list of the accessing transactions and what type of lock they are holding may be contained in the lock table to physically realize the invention. Using this configuration, a transaction ID field, as well as 3 bits to denote whether the item is read or write locked by either a type A, B, or C transaction, may be used. When a transaction wishes to access an item, it checks the lock table to determine if there is any conflict, and proceeds accordingly. When a transaction becomes a different type, for example when a type A transaction becomes a type C transaction, it must change all of the locks it uses to those of the new type.

A more compact table of conflicts, as shown in Table 2, may also be used. In this table, RBC denotes a read lock request from either a type B or a type C transaction, and WBC denotes a similar write lock request. RAC denotes a read lock held by either a type A or a type C transaction, and WAC denotes a similar write lock. This table now requires only two bits for the lock type as opposed to three for the expanded table of conflicts.

TABLE 2

|  |  | Lock Held | | | |
|---|---|---|---|---|---|
|  |  | RAC | WAC | RB | WB |
| Lock Requested | RA | S | X | S | KL |
|  | WA | X | X | KL | KL |
|  | RBC | S | X | S | X |
|  | WBC | X | X | X | X |

Instead of giving preference to transactions solely until they have displayed the first page of data, transactions can be treated preferentially any time the user is waiting for a response. In other words, even after the transaction has accessed a first set of data, or K data items, it can regain a high database access priority value after the user has input a response and is waiting for further information from that transaction. This would be desirable in the case where the user is presented with information and then may request more information based on what is presented on the screen. For example, in the case of a banking transaction, the user may be asked for a city name and then, upon input by the user, the computer lists all the accounts in the city. The user may be asked to enter additional city names. The transaction would become a type A transaction each time a new city is entered, and become a type C transaction after the first page of each city's information is displayed. In other words, fast-response transactions move between type A and type C transaction types continually.

This priority switching is demonstrated in FIG. 2. After a first set of data has been accessed in a fast-response transaction, the database priority is set to "low" at step 235, or the C state, while the user is examining what information has been retrieved and displayed on the screen. The user responds to the set of data at step 240, and the concurrency control method then determines if more data needs to be retrieved and sent to the screen. If so, the database priority for the same transaction is switched from "low" to "high" at step 250, or back to type A, while the additional information is retrieved from the database. After this additional information is retrieved and displayed, the database priority once again is set to "low," or type C, while the user examines the new information on the screen. This cycle of "high"-"low," type A-C priority continues until no further data needs to be retrieved from the database and displayed.

In the case where the user is accessing an information retrieval system containing a large amount of information, the response time of the system can be very large. The invention could be used to speed up the perceived response time of the system. This can be accomplished by giving higher priority to the transaction until it has produced sufficient information, perhaps the first three items of interest. While the user is examining these entries, the system can give priority to another transaction that is waiting to display data. If the user can only examine three retrieved items at once, and the search will retrieve many more than three items, say 100 items, the system will seem very slow to the user who has to wait while all 100 items are retrieved from the database. With the present invention, the system can quickly retrieve the first three data items, display them on the screen immediately, and then, while the user is examining these items, retrieve additional items from the database. In this case, the transaction would switch from type A to type C after the three items of data have been retrieved and displayed, and then switch back from type C to the speedy type A to retrieve additional information from the database.

When the information retrieval system contains a large amount of information, a non-trivial query by the user can lead to a large amount of data being returned by the system to the user. The invention is useful in these cases where the user wants to browse through the data. A great deal of time and computational effort may be saved if a subset of the large amount of data were available very quickly to the user. This would allow the user to cancel incorrectly specified queries. Using the invention, for example, three of a requested 100 data items may be displayed immediately, without waiting for the other 97 data items to be retrieved. The user would be able to view that information quickly and determine if her search is on the right track. If not, the user can cancel the non-productive search immediately, and the time, effort, and expense of retrieving the other 97 data items is spared.

In addition to the case where the user is accessing an information retrieval system containing a large amount of information, the concurrency control method disclosed by the present invention may be used within the mobile environment; namely, portable computers. Portable computers with the capacity for wirelessly connecting to non-mobile systems have recently appeared on the market in large numbers. These portable computers can be used to access information held locally, as well as data stored in a non-mobile DBMS server. The special characteristics of such mobile environments require many changes in current DBMS techniques. As discussed below, the concurrency control method disclosed by the present invention is ideally suited for the mobile environment.

Two particular characteristics of such mobile systems are of interest here. First, due to power considerations, which make CPUs and disk drives slower, and due to networking concerns, wide area wireless networks have relatively low bandwidths, currently about 8 Kbits/sec, the response time of mobile DBMSs will be slower than that of non-mobile implementations. This characteristic forces DBMS implementors to be very concerned about response time. The invention precisely addresses this concern. The new technique can be used to give higher priority to interactive transactions that are in the process of accessing the first set of data for a user. While the user examines this initial information, the DBMS can use this time to finish the remainder of the query. This results in the user perceiving a faster response time.

Second, due to size, weight, and power considerations, the screens of such portable systems are smaller, sometimes much smaller, than that of standard CRTs. For example, an "APPLE NEWTON MESSAGEPAD" (Apple and Newton are registered trademarks of Apple Corporation) has approximately a 5 inch monitor, while the usual workstation CRT is closer to 19 inches in diagonal. This means that relatively few data items will fit on the screen of such a notepad computer at one time. The invention is perfectly suited to address this concern. A search could be tailored such that as soon as the amount of data that can fit on the smaller screen has been retrieved it would be displayed. A search that would retrieve either all the data or enough data to fit on a big 19 inch screen before displaying it is not efficient and would seem slow to a user with a small screen computer. This concurrency control method would increase the perceived operating speed of the database system on small screen computers.

The present invention differs from the usual timestamp-based techniques. The scheme of the present invention does not rely on unique timestamp IDs being assigned to individual transactions.

The wound-wait and wait-die techniques make use of preemption, transactions sometimes are forced to abort, but they differ from the method of the present invention in that the priority scheme derived from the timestamp is static; i.e., once a timestamp is given to a transaction the priority of that transaction with respect to other transactions does not change at any time in the future. Furthermore, the timestamp assigned is not related to the state of the transaction, such as "waiting for user" or "performing I/O", but rather it is determined by the DBMS.

The priority scheme studied by Abbot and Garcia-Molina, supra., does consider dynamic priorities. However, there the priority is steadily increasing for a transaction. As time passes, a transaction's deadlines becomes closer, and this decreases the slack time. Under the scheme of the present invention, priority increases as a transaction is trying to complete a screenfull of results, and decreases thereafter. Furthermore, a transaction's priority might increase and decrease many times.

While the invention has been described in terms of an exemplary embodiment, it is contemplated that it may be practiced as outlined above with modifications within the spirit and scope of the appended claims.

What is claimed:

1. A method of concurrency control for a database management system, comprising the steps of:
   a) designating each of a plurality of transactions intended for the database management system as being one of fast-response type and batch type;
   b) determining if each of said plurality of transactions that is designated fast-response type has been allowed to access a first set of data;
   c) assigning a high database access priority value for each of said plurality of transactions that is designated fast-response type and has not accessed the first set of data; and
   d) assigning a low database access priority value for each of said plurality of transactions that is designated fast-response type and has accessed the first set of data;
   wherein each of said plurality of transactions that is assigned said high database access priority is permitted access to said database management system before each of said plurality of transactions that is assigned said low database access priority.

2. A method of concurrency control for a database management system as recited by claim 1, further comprising the step of:
   e) assigning said high database access priority value to each of said plurality of transactions that was previously assigned said low priority value and is to access a further set of data.

3. A method of concurrency control for a database management system as recited by claim 2, further comprising the step of:
   f) assigning a batch database access priority value to each of said plurality of transactions that was previously assigned said low priority value and is not to access said further set of data.

4. A method of concurrency control for a database management system, wherein a data item is sought by each of a plurality of transactions, comprising the steps of:
   a) designating each of said plurality of transactions intended for the database management system one of active fast response type, completing fast response type, and batch type;
   b) determining for at least one of said plurality of transactions if a lock exists for said data item; and
   c) obtaining said lock on said data item if said lock exists;
   wherein each of said plurality of transactions that has obtained said lock on said data item is given database access priority over each of said plurality of transactions that has not obtained said lock on said data item and fast response-type transactions that have not accessed a first set of data are given priority over fast response-type transactions that have accessed the first set of data.

5. A method of concurrency control for a database management system as recited by claim 4, further comprising the step of:
   d) determining a course of action from a table of conflicts if said lock does not exist.

6. Apparatus for concurrency control for a database management system, comprising:
   a) classification means for designating each of a plurality of transactions intended for the database management system one of fast-response type and batch type;
   b) identification means for determining if each of said plurality of transactions that is designated fast-response type has not displayed a screen of data;
   c) assignment means for assigning a high database access priority value for each of said plurality of transactions that is designated fast-response type and has not displayed said screen of data; and
   d) assignment means for assigning a low database access priority value for each of said plurality of transactions that is designated fast-response type and has displayed said screen of data.

7. Apparatus according to claim 6, further comprising assignment means for assigning said high database access priority value to each of said plurality of transactions that was previously assigned said low priority value and is to display a further screen of data.

8. Apparatus according to claim 7, further comprising assignment means for assigning a batch database access priority value to each of said plurality of transactions that was previously assigned said low priority value and is not to display said further screen of data.

9. Apparatus for concurrency control for a database management system, wherein a data item is sought by each of a plurality of transactions, the apparatus comprising:

a) classification means for designating each of said plurality of transactions intended for the database management system one of active fast response type, completing fast response type, and batch type;

b) determination means for determining for at least one of said plurality of transactions if a lock exists for said data item; and c) procurement means for obtaining said lock on said data item if said lock exists and fast response-type transactions that have not accessed a first set of data are given priority over fast response-type transactions that have accessed the first set of data.

10. Apparatus according to claim 9, further comprising assignment means for assigning a course of action from a table of conflicts if said lock does not exist.

* * * * *